No. 804,284. PATENTED NOV. 14, 1905.
H. D. WATERHOUSE & F. W. GREEN.
DEVICE FOR REMOVING THE SEDIMENT FROM GASOLENE.
APPLICATION FILED DEC. 3, 1904.
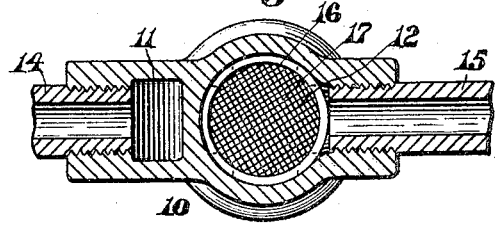
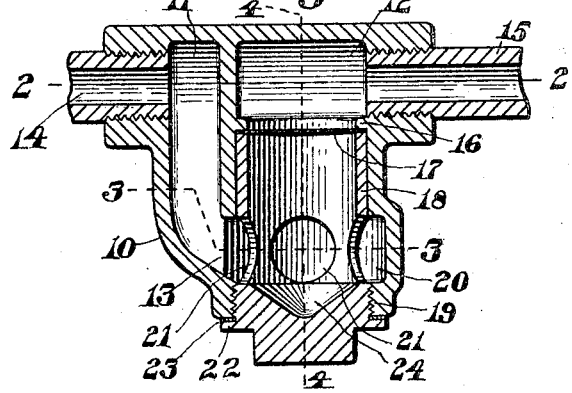
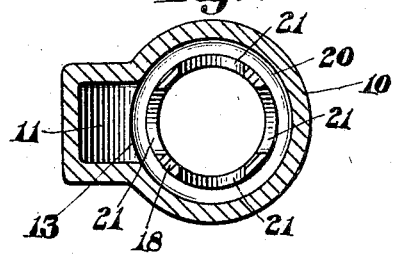
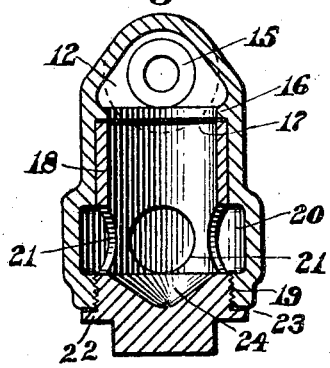
Witnesses:
Nathan C. Lombard 2nd
Winthrop G. Whitehead
Inventors:
Harold D. Waterhouse,
Frederick W. Green,
by Walter E. Lombard,
Atty.

UNITED STATES PATENT OFFICE.

HAROLD D. WATERHOUSE AND FREDERICK W. GREEN, OF QUINCY, MASSACHUSETTS; SAID GREEN ASSIGNOR TO SAID WATERHOUSE.

DEVICE FOR REMOVING THE SEDIMENT FROM GASOLENE.

No. 804,284. Specification of Letters Patent. Patented Nov. 14, 1905.

Application filed December 3, 1904. Serial No. 235,335.

*To all whom it may concern:*

Be it known that we, HAROLD D. WATERHOUSE and FREDERICK W. GREEN, citizens of the United States of America, and residents of Quincy, in the county of Norfolk and State of Massachusetts, have invented certain new and useful Improvements in Devices for Removing Sediment from Gasolene, of which the following is a specification.

This invention relates to pipe-strainers, and has for its object the production of a strainer which can be inserted in a line of pipe through which gasolene and other materials of that nature pass. This strainer is designed to cause the gasolene or other material passing through the pipe to take an irregular or tortuous course through the strainer, in transit passing through a screen or other similar device, by which the impurities in the gasolene or other substance may be removed therefrom and collected in a sediment-chamber beneath said screen.

It consists in certain novel features of construction and arrangement of parts, which will be readily understood by reference to the description of the drawings, and to the claims, to be hereinafter given.

Of the drawings, Figure 1 represents a vertical section of a pipe-strainer embodying the features of this invention. Fig. 2 represents a horizontal section of the same, the cutting-plane being on line 2 2 on Fig. 1. Fig. 3 represents a horizontal section of the same, the cutting-plane being on line 3 3 on Fig. 1; and Fig. 4 represents a vertical section of the same, the cutting-plane being on line 4 4 on Fig. 1.

Similar characters designate like parts throughout the several figures of the drawings.

In the drawings, 10 represents a casing which is provided with two parallel vertical chambers 11 and 12, communicating at the bottom, as at 13. An inlet-pipe 14 communicates with the upper end of the chamber 11, and in direct line therewith a pipe 15 communicates with the chamber 12 at the top thereof. Immediately beneath the pipe 15 is an annular shoulder or lip 16, projecting into the cylindrical portion of said chamber. Against the under side of this shoulder 16 a screen 17 is held by means of a hollow cylindrical plug 18, tapped at 19 into the lower end of the casing 10. The casing 10 is provided with an annular passage 20, surrounding the hollow cylindrical plug 18, said passage 20 connecting with the inlet-passage 11, while at the same time it communicates through openings 21 in said hollow cylindrical plug with the interior thereof. The plug 18 is provided with a projecting lip 22, between which and the end of the casing 10 is interposed a packing-ring 23.

Ordinarily the pipes used for the passage of gasolene and similar substances become clogged by means of impurities contained therein and oftentimes prevent the successful operation of the motors to which said material is being transmitted. Where vertical screens have been used on a line of pipe, while they separate some of the impurities from the gasolene or other substances, at the same time the impurities are usually collected at the screen and soon clog it up, so that the gasolene is prevented from passing through. The object of the present invention is to obviate this difficulty and to insert a screen in the line of pipe in such a manner as to permit the screen to separate the impurities therefrom as the gasolene or other substance passes therethrough and at the same time so locate the screen as to keep it from becoming clogged by these impurities, while provision is made also for a receptacle 24 in the bottom of the screw-plug 18 to collect the sediment. In order to accomplish this, it is obvious that it is necessary that the screen 17 should be horizontal in a vertical chamber or passage and that the gasolene and other substance to pass through the screen should be directed thereto from beneath. In this manner all the light impurities in the gasolene will be separated by the screen, and in the jarring which takes place in the motor of a boat or carriage these impurities will be shaken from the screen and dropped into the receptacle 24 in the bottom of the plug. The heavier impurities as they pass from the inlet-pipe 14 through the passage 11 will collect in the receptacle 24 in the bottom of the plug and will not rise in the chamber 12 a sufficient distance to reach the screen 17. This is also true of any water which might be contained within the gasolene.

The strainer is designed in such a manner as to provide a receptacle of sufficient size to contain a greater quantity of gasolene or other substance than can readily pass through the outlet-pipe 15, the object of this being to secure a storage of sufficient gasolene or other substance to produce a sufficient supply to the motor to continue its operation when the main feed of the gasolene or other substance is cut off for any reason, as in a heavy seaway in the case of a motor mounted in a boat or the tipping of a carriage when the motor is mounted in a motor-vehicle.

The object of the annular passage 20 around the tubular plug 18 is to cause the gasolene or other substance passing from the inlet-passage 11 to this annular passage 20 to pass therefrom in all directions through the openings 21 in the plug 18, the various streams thereof uniting at the center of the plug in such a manner that the heavy impurities will be forced downwardly, while the gaseous portion will be permitted to rise and pass through the screen 17.

The plug 18 is tapped into the casing 10 at 19, so that it may be readily removed at any time to clean out the heavy dirt and water in the receptacle 24 or the light dirt which may remain upon the screen 17, this cleaning process being consummated without disturbing in any way the line of pipes 14 and 15.

By making the strainer so that the pipes 14 and 15 are in line one with the other the strainer can be much more readily set up than could be done otherwise.

It is believed that the operation of this invention will be thoroughly understood without any further description.

Having thus described our invention, we claim—

1. A pipe-strainer comprising a casing having a vertical chamber, a horizontal outlet-pipe communicating with the top of said chamber, a hollow screw-plug provided with a closed end tapped into the bottom of said chamber, a wire screen interposed between said plug and said outlet and extending over the open end of said plug, an annular passage around said plug near the bottom of said chamber and communicating with the interior of said plug, and an inlet extending from a point near the top of said chamber and communicating therewith near the bottom thereof.

2. A pipe-strainer comprising a casing having a vertical chamber, an outlet communicating therewith near the top thereof and extending horizontally therefrom, a hollow screw-plug provided with a closed end tapped into the bottom of said casing and communicating with said chamber at the top, a reversible screen interposed between the top of said plug and the outlet, a sediment-chamber in the bottom of said plug, and an inlet communicating with the interior of said plug near the bottom of said chamber.

3. A pipe-strainer comprising a casing having a vertical chamber, an outlet communicating with the top of said chamber and extending horizontally therefrom, a shoulder beneath said outlet, a plug screwed into the bottom of said casing and provided with a tubular projection fitting the interior of said vertical chamber, a reversible wire screen interposed between the end of said projection and said shoulder, and an inlet communicating with the bottom of said tubular projection.

4. A pipe-strainer comprising a casing having a vertical chamber, an outlet communicating with the top of said chamber and extending horizontally therefrom, a shoulder beneath said outlet, a plug screwed into the bottom of said casing and provided with a tubular projection fitting the interior of said vertical chamber, a wire screen interposed between the end of said projection and said shoulder, an annular passage surrounding said tubular projection and communicating with the interior thereof, and an inlet communicating with said passage.

5. A pipe-strainer comprising a casing having a vertical chamber, an outlet communicating with the top of said chamber and extending horizontally therefrom, a shoulder beneath said outlet, a plug screwed into the bottom of said casing and provided with a tubular projection fitting the interior of said vertical chamber, a wire screen interposed between the end of said projection and said shoulder, an annular passage surrounding said tubular projection, radial inlets therefrom to the interior of said tubular projection, and an inlet communicating with said passage.

6. A pipe-strainer comprising a casing having a vertical chamber and provided with an inlet-pipe and an outlet-pipe in axial line, a shoulder below the level of said outlet-pipe, a plug screwed into the bottom of said casing and provided with a tubular projection fitting the interior of said vertical chamber and provided with radial inlets to the interior thereof, a wire screen interposed between the end of said projection and said shoulder, an annular chamber surrounding said tubular projection and communicating with the interior thereof, and a passage connecting said annular chamber and said inlet.

7. A pipe-strainer comprising a casing provided with two parallel vertical chambers communicating at the bottom, a horizontal outlet-pipe communicating with the top of one of said chambers, a horizontal inlet-pipe in axial line with said outlet-pipe communicating with the other chamber, a shoulder in the outlet-chamber below the level of said pipes, a removable hollow plug provided with radial openings therein tapped into the bottom of said outlet-chamber, a wire screen interposed between the plug and shoulder, and an annular passage surrounding said hollow plug at a level with said openings and communicating with said inlet-chamber.

Signed by us at Boston, Massachusetts, this 1st day of December, 1904.

HAROLD D. WATERHOUSE.
FREDERICK W. GREEN.

Witnesses:
WALTER E. LOMBARD,
EDNA C. CLEVELAND.